(12) United States Patent
Tamura et al.

(10) Patent No.: US 9,575,245 B2
(45) Date of Patent: Feb. 21, 2017

(54) OPTICAL FIBER

(71) Applicant: SUMITOMO ELECTRIC INDUSTRIES, LTD., Osaka-shi, Osaka (JP)

(72) Inventors: Yoshiaki Tamura, Yokohama (JP); Tetsuya Haruna, Yokohama (JP); Yoshihiro Saito, Yokohama (JP); Yuki Kawaguchi, Yokohama (JP); Masaaki Hirano, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/943,190

(22) Filed: Nov. 17, 2015

(65) Prior Publication Data
US 2016/0147010 A1  May 26, 2016

(30) Foreign Application Priority Data
Nov. 20, 2014 (JP) ................. 2014-235290

(51) Int. Cl.
*G02B 6/036* (2006.01)
*G02B 6/02* (2006.01)
(Continued)

(52) U.S. Cl.
CPC .............. *G02B 6/02* (2013.01); *C03B 37/014* (2013.01); *C03B 37/01211* (2013.01); *C03B 37/01807* (2013.01); *C03B 37/01861* (2013.01); *C03B 37/01892* (2013.01); *C03C 3/06* (2013.01); *C03C 13/045* (2013.01); *C03B 2201/06* (2013.01); *C03B 2201/07* (2013.01);
(Continued)

(58) Field of Classification Search
None
See application file for complete search history.

(56) References Cited

U.S. PATENT DOCUMENTS

| 5,146,534 A | 9/1992 | Lines |
| 6,153,546 A | 11/2000 | Saitoh et al. |

(Continued)

FOREIGN PATENT DOCUMENTS

| CN | 102654602 B | 2/2014 |
| EP | 2 479 150 A1 | 7/2012 |

(Continued)

*Primary Examiner* — Tina Wong
(74) *Attorney, Agent, or Firm* — Drinker Biddle & Reath LLP (57) ABSTRACT

An optical fiber containing an alkali metal and capable of reducing Rayleigh scattering loss is provided. An optical fiber has a core and a cladding made of silica glass and enclosing the core. The cladding contains fluorine and has a refractive index lower than the refractive index of the core. The core contains first group dopants selected from the group of Na element, K element, or a compound thereof at an average concentration of 0.2 ppm or more and 10 ppm or less. The core also contains second group dopants for reducing the viscosity of silica glass and having a diffusion coefficient of $1\times10^{-12}$ cm$^2$/s or more and smaller than the diffusion coefficient of the first group dopants, by an average concentration of 0.2 ppm or more at a temperature of 2000° C. to 2300° C.

18 Claims, 5 Drawing Sheets

(51) Int. Cl.
*C03B 37/012* (2006.01)
*C03B 37/014* (2006.01)
*C03B 37/018* (2006.01)
*C03C 3/06* (2006.01)
*C03C 13/04* (2006.01)

(52) U.S. Cl.
CPC ...... *C03B 2201/12* (2013.01); *C03B 2201/20* (2013.01); *C03B 2201/50* (2013.01); *C03B 2203/22* (2013.01); *C03B 2203/26* (2013.01); *C03B 2205/40* (2013.01); *C03C 2201/11* (2013.01); *C03C 2201/12* (2013.01); *C03C 2201/50* (2013.01); *C03C 2203/40* (2013.01)

(56) References Cited

U.S. PATENT DOCUMENTS

| | | | |
|---|---|---|---|
| 7,088,900 B1 | 8/2006 | Mishra | |
| 7,844,155 B2* | 11/2010 | Bickham | G02B 6/02333 385/126 |
| 9,097,834 B2* | 8/2015 | Hirano | C03B 37/01211 |
| 9,335,465 B2* | 5/2016 | Hirano | G02B 6/02 |
| 2005/0201699 A1* | 9/2005 | Ball | C03B 37/01228 385/123 |
| 2006/0130530 A1 | 6/2006 | Anderson et al. | |
| 2008/0279515 A1* | 11/2008 | Bickham | G02B 6/02333 385/123 |
| 2015/0370008 A1* | 12/2015 | Tamura | C03B 37/01807 385/123 |
| 2016/0318793 A1* | 11/2016 | Tamura | C03C 13/046 |

FOREIGN PATENT DOCUMENTS

| | | |
|---|---|---|
| EP | 2 511 741 A2 | 10/2012 |
| EP | 2 784 033 A1 | 10/2014 |
| EP | 2 808 310 A1 | 12/2014 |
| WO | WO-2004/020357 A2 | 3/2004 |
| WO | WO-2005/021455 A2 | 3/2005 |
| WO | WO-2007/149344 A1 | 12/2007 |
| WO | WO-2008/024255 A2 | 2/2008 |
| WO | WO-2008/136929 A1 | 11/2008 |
| WO | WO 2014/178361 A1 | 11/2014 |

* cited by examiner

| Atom | Na | K | Cs | Ca |
|---|---|---|---|---|
| Diffusion coefficient cm$^2$/s | 6 × 10$^{-5}$ | 4 × 10$^{-6}$ | 2 × 10$^{-6}$ | 6 × 10$^{-7}$ |

OPTICAL FIBER

FIELD OF THE INVENTION

The present invention relates to an optical fiber.

BACKGROUND ART

An optical fiber having a silica-based glass core containing an alkali metal is known as an optical fiber exhibiting low Rayleigh scattering loss and low attenuation. If an alkali metal is contained in the core region of an optical fiber preform, the viscosity of the core region can be lowered, whereby the network structure of silica glass will be unified when the optical fiber preform is drawn into a fiber, and consequently the Rayleigh scattering loss due to structural unevenness can be decreased.

WO 2004/020357 and US 2006/0130530A indicate a diffusion method as a way of doping an alkali metal into silica glass. In the diffusion method, vapor of materials, such as an alkali metal or alkali metal salt, is introduced into a glass tube, and the alkali metal is diffusion-doped onto the inner surface of the glass tube by heating the glass tube with an outside heat source or by generating plasma in the glass tube.

After doping the vicinity of inner surface of the glass tube with an alkali metal in the above-mentioned manner, the diameter of the glass tube is reduced by heating it. After such diameter reduction, the inner surface of the glass tube is etched by a certain thickness in order to remove transition metal elements such as Ni and Fe, which were simultaneously added when the alkali metal was doped. It is possible to keep the alkali metal elements to remain even if the transition metal elements are removed by etching the glass surface by a certain thickness, because the diffusion of the alkali metal elements is quicker than that of the transition metal elements. After such etching, the glass tube is collapsed by heating, whereby a core rod containing an alkali metal is made. The core rod containing an alkali metal may be provided with glass around the perimeter thereof so that a core region for making a core of an optical fiber may be formed as a whole.

An optical fiber preform is produced in a manner in which a cladding region having a refractive index lower than that of the core region containing an alkali metal is formed around the outside of the core region. An optical fiber can be produced by drawing the optical fiber preform by a well-known method.

SUMMARY OF THE INVENTION

Object of the Invention

An object of the present invention is to provide an optical fiber which contains an alkali metal and in which Rayleigh scattering loss is reduced.

Means for Achieving the Object

The optical fiber of the present invention has a core made of silica glass and a cladding which is formed around the core and which is made of silica glass having a refractive index lower than the refractive index of the core. The core contains a first group of dopants consisting of Na element, K element, or any compound thereof by concentration of 0.2 ppm or more on the average and a second group of dopants by 0.2 ppm or more on the average, whereas the second group of dopants decrease the viscosity of silica glass and have a diffusion coefficient of $1\times10^{-12}$ $cm^2/s$ or more and smaller than the diffusion coefficient of the first group of dopants at a temperature of 2000° C. to 2300° C. The cladding contains fluorine. Here, "ppm" means the number of dopant atoms in one million $SiO_2$ units.

In the optical fiber of the present invention, the average concentration of the first group of dopants may be 10 ppm or less, and the diffusion coefficient of the second group dopants may be $1\times10^{-12}$ $cm^2/s$ or more and smaller than the diffusion coefficient of the first group dopants in the whole range of 2000° C. to 2300° C.

Regarding the optical fiber of the present invention, in the core and the cladding, the average concentration of the first group dopants is preferably 0.2 ppm or more and 10 ppm or less at a domain up to 3 times the mode field diameter, and in the core, the average concentration of the second group dopants is preferably higher than the average concentration of the first group dopants. In the core, the average concentration of the second group dopants is preferably 0.2 ppm or more and 100 ppm or less. The core preferably contains, as the second group dopants, any one or more selected from the group of Rb, Cs, Mg, Ca, and Sr, at an average concentration of 0.2 ppm or more and 100 ppm or less.

The optical fiber preform of the present invention has a core region, which is made of silica glass and which will become the core of an optical fiber, and a cladding region, which is made of silica glass exhibiting a refractive index lower than the refractive index of the core region and which is formed around the core region so as to become the cladding of the optical fiber. The core region contains a first group of dopants selected from the group of Na element, K element, or a compound thereof, at an average concentration of 20 ppm or more and 100 ppm or less, and a second group of dopants, which are used for decreasing the viscosity of silica glass and which have diffusion coefficient of $1\times10^{-12}$ $cm^2/s$ or more at a temperature of 2000° C. to 2300° C. and smaller than the diffusion coefficient of the first group dopants, at an average concentration of 0.2 ppm or more and 100 ppm or less. The cladding region contains fluorine.

In the optical fiber preform of the present invention, the diffusion coefficient of the second group dopants may be $1\times10^{-12}$ $cm^2/s$ or more and smaller than the diffusion coefficient of the first group dopants in the whole range of 2000° C. to 2300° C. The position where the concentration of the first group dopants is the maximum may be in a cylindrical domain within ⅓ or less of the mode field diameter in the optical fiber.

Effect of the Invention

The optical fiber of the present invention includes an alkali metal and can reduce Rayleigh scattering loss.

DETAILED DESCRIPTION OF THE INVENTION

Hereafter, preferred embodiments for carrying out the present invention will be described in detail with reference to accompanying drawings. The present invention is not limited to these examples and is shown by the claims, whereas it is intended that all modifications and equivalents to the claims should be included in the scope of invention.

The inventors of the present invention found the following facts with respect to manufacture of an optical fiber which includes an alkali metal and which exhibits low attenuation. When elements such as Na and K which have a fast diffusion speed were used as an alkali metal, the alkali metal diffused to the outside of the core region at a drawing process. Consequently, the glass viscosity could not be reduced sufficiently, and therefore the Rayleigh scattering loss could not be reduced. On the other hand, when elements with slow diffusion velocity, such as Cs and Ca, were used as an alkali metal, the alkali metal remained in the core central portion at the drawing process, causing a failure in reducing the viscosity of a cladding region and the peripheral part of the core region, whereby a significant distortion occurred. Consequently, the Rayleigh scattering loss could not be reduced. In this regard, the temperature at a drawing step and duration of stay in a furnace cannot be used as conditions for controlling the diffusion of elements because such factors are determined depending on the drawing speed and the size of an optical fiber preform.

Figure 1:
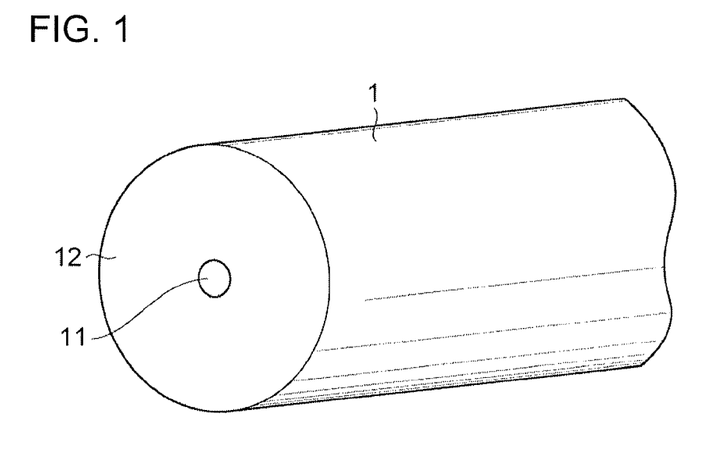
FIG. 1 is a schematic diagram showing an optical fiber according to an embodiment of the present invention.

FIG. 1 is a schematic diagram showing an optical fiber 1 according to an embodiment of the present invention. The optical fiber 1 has a core 11 and a cladding 12, which are made of silica glass. The cladding 12 encloses the core 11, has a refractive index lower than the refractive index of the core 11, and contains fluorine. The core 11 contains first group dopants selected from the group of Na element, K element, or a compound thereof at an average concentration of 0.2 ppm or more and 10 ppm or less. The core 11 also contain second group dopants, which are for reducing the viscosity of silica glass and which have a diffusion coefficient of $1 \times 10^{-12}$ cm$^2$/s or more and smaller than the diffusion coefficient of the first group dopants, by an average concentration of 0.2 ppm or more at temperatures of 2000° C. to 2300° C.

The optical fiber preform according to an embodiment of the present invention is a preform for manufacturing optical fibers, such as those mentioned above, by drawing it, and it has a core region and a cladding region which are made of silica glass. The core region will become the core of an optical fiber. The cladding region will become a cladding of the optical fiber.

The cladding region encloses the core region, has a refractive index lower than the refractive index of the core region, and contains fluorine. The core region contains first group dopants selected from the group of Na element, K element, and a compound thereof. The first group dopants having a large diffusion coefficient will diffuse at a drawing step, whereby the concentration will decrease to about ⅒. Therefore, in order to keep the average concentration of the first group dopants in the core of an optical fiber within the range of 0.2 ppm or more and 10 ppm or less, the average concentration of the first group dopants in the optical fiber preform should be 20 ppm or more and 100 ppm or less. The core region contains second group dopants, which are for decreasing the viscosity of silica glass and which have a diffusion coefficient of $1 \times 10^{-12}$ cm$^2$/s or more and smaller than the diffusion coefficient of the first group dopants at a temperature of 2000° C. to 2300° C., by average concentration of 0.2 ppm or more and 100 ppm or less.

Figure 2:
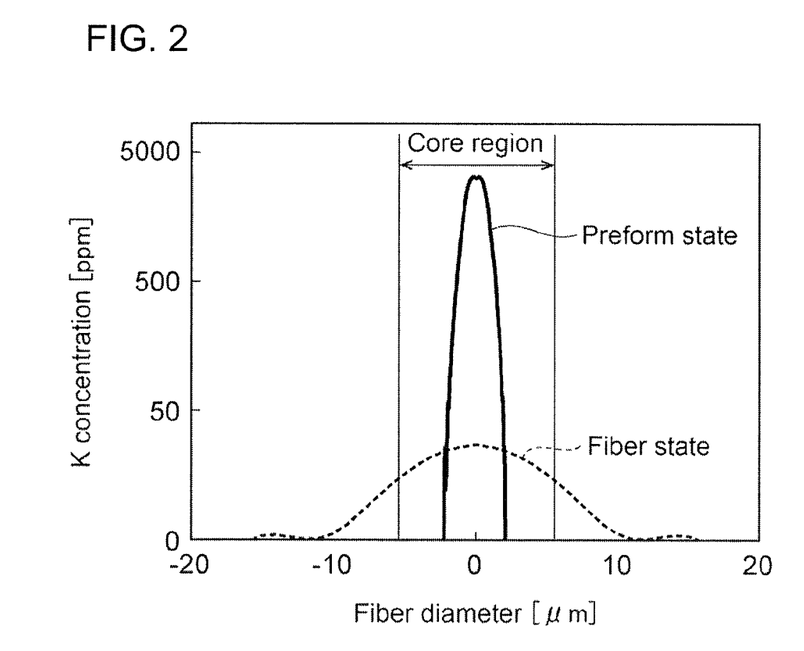
FIG. 2 is a graph showing distributions of K concentration in the radial direction with respect to an optical fiber preform and an optical fiber.

FIG. 2 is a graph showing the respective distributions of K concentration in the radial direction with respect to an optical fiber preform and an optical fiber. FIG. 2 shows the distribution of each element in the radial direction by reducing the diameter of the core region of an optical fiber preform so as to coincide it with the core diameter of the optical fiber. The first group dopants (Na or K) contained in the core region of the optical fiber preform have a large diffusion coefficient and diffuses in the whole core of the optical fiber (and further to the cladding) by high temperature heating at a drawing step. The concentration of the first group dopants in the core of the optical fiber decreases to about ⅒ as compared with the state of the optical fiber preform, and consequently the Rayleigh scattering loss of the core cannot fully be reduced. However, the first group dopants diffuse to the cladding, whereby the viscosity of the cladding will be reduced, and accordingly the distortion due to differences of viscosity between the core and the cladding will be lessened. This will have an effect of reducing the Rayleigh scattering loss of the cladding and the peripheral part of the core. Thus, the Rayleigh scattering loss is reduced, including that of the cladding, and consequently the attenuation will be 0.154 dB/km in the case where K is included.

Figure 3:
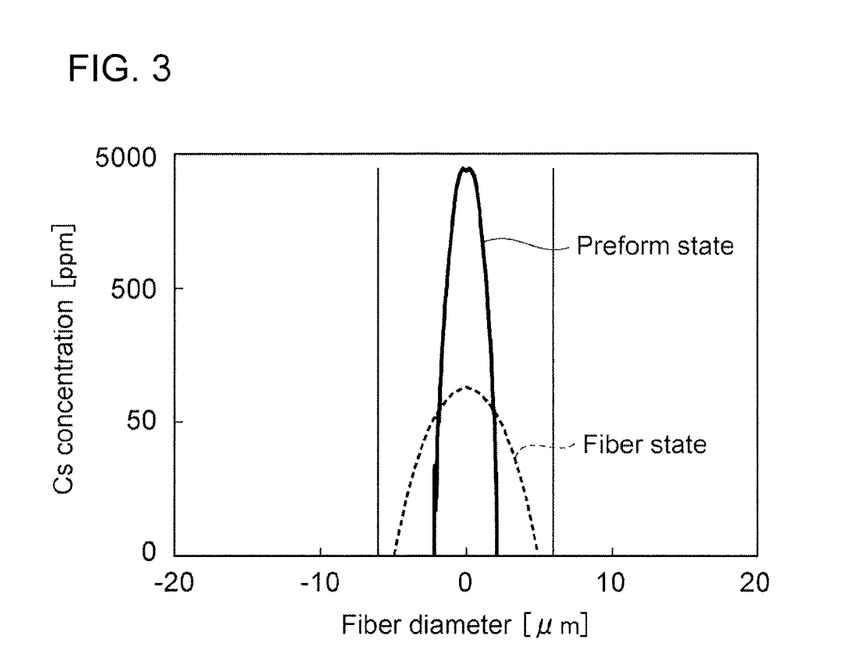
FIG. 3 is a graph showing distributions of Cs concentration in the radial direction with respect to an optical fiber preform and an optical fiber.

FIG. 3 is a graph showing the distributions of Cs concentration in the radial direction with respect to an optical fiber preform and an optical fiber. FIG. 3 also shows the distribution of each element in the radial direction by reducing the diameter of the core region of an optical fiber preform so as to coincide it with the core diameter of the optical fiber. In the case where the core region of an optical fiber preform contains the second group dopants, most of the second group dopants remain within the core also in an optical fiber, since the diffusion coefficient of the second group dopants is about ½ of the diffusion coefficient of the first group dopants. When the core region contains the second group dopants at the same concentration as that of the first group dopants, the Rayleigh scattering loss of the optical fiber core can be more reduced.

On the other hand, the viscosity of the cladding does not decrease, since the second group dopants do not diffuse to the cladding, and accordingly differences in viscosity occur at the interface of the core and the cladding. This causes distortion, whereby the Rayleigh dispersion will be made higher at such part. Therefore, in the case where the first group dopants are not included while the second group dopants are included, the attenuation of an optical fiber will be 0.156 dB/km as a whole.

With an optical fiber of this embodiment, it is possible to reduce Rayleigh scattering loss to a sufficiently low level by containing first group dopants having a large diffusion coefficient and second group dopants having a small diffusion coefficient.

Figure 7:
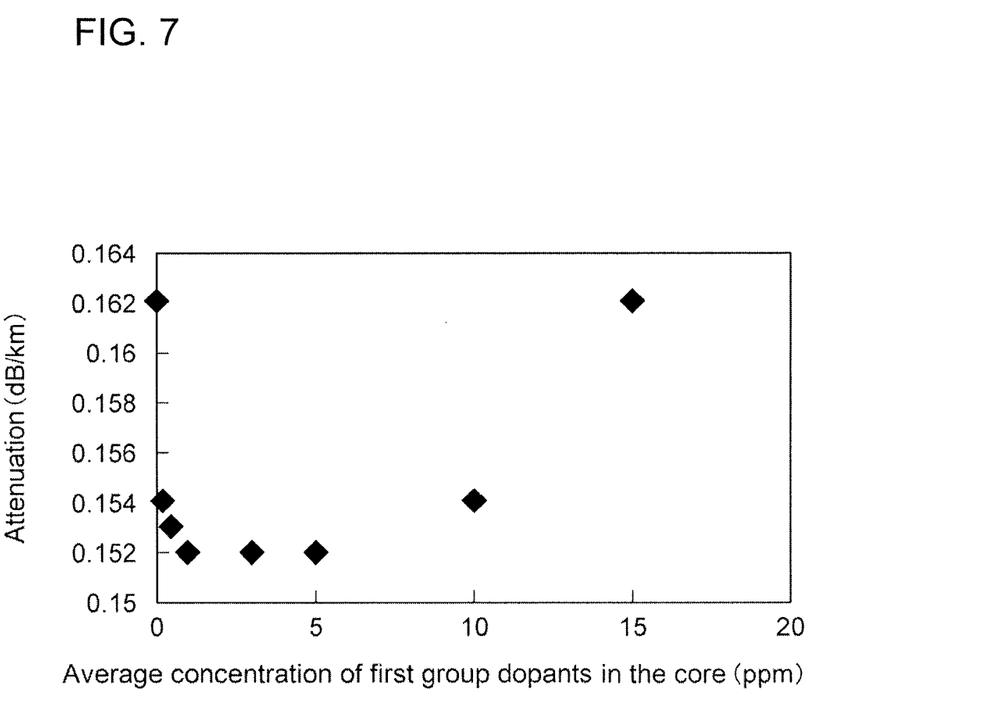
FIG. 7 is a graph showing a relationship between the attenuation of an optical fiber and the average concentration of a first group of dopants in the core.

FIG. 7 is a graph showing a relationship between the attenuation of an optical fiber and the average concentration of a first group of dopants in the core. The attenuation tends to decrease according to increase of the average concentration of the first group dopants in the core of an optical fiber, while the attenuation tends to increase when the average concentration is 10 ppm or more. This is because the average concentration of the first group dopants in the preform must be made high (e.g., 10,000 ppm at a peak value) in order to attain a high concentration of the first group dopants in the optical fiber, and consequently, the attenuation increase due to occurrence of glass defect or crystallization.

The first group dopants diffuse to the outside of a core, and consequently the Rayleigh scattering loss decreases not only in the core but also in the cladding, whereby the attenuation can be reduced. In such case, the first group dopants preferably spread by diffusion to the extent of 3 times the mode field diameter (MFD). MFD is the diameter of a circumference where the intensity of light which travels inside an optical fiber is $1/e^2$ times the peak value thereof, and the MFD can be considered as the effective diameter of the core. Since 99.99% of light power travels within a range of 3 times the MFD in the fiber, the outside thereof can be disregarded with respect to the attenuation of the transmission light. Therefore, for the purpose of reducing the attenuation, it is essential for the first group dopants to diffuse to the extent of 3 times the MFD and to reduce the Rayleigh scattering in such range.

The cladding contains an F-element as a dopant for lowering the refractive index, and the F-element will help to reduce its viscosity. Therefore, decrease of Rayleigh scattering loss can be seen according to sufficient reduction in viscosity when the cladding has the first group dopants with an average concentration of about 0.2 ppm.

In order to lower the viscosity of the core region to the same extent as the cladding region which contains K-elements of 0.2 ppm, preferably the core region includes the second group dopants, which exhibit slow diffusion and small reduction in concentration at the time of drawing into a fiber, at the same concentration of 10 ppm or more as K-elements in average of the core region. Thus, it is made possible to secure the concentration of dopants in the core upon drawing into a fiber, without raising the concentration of dopants in the core region of optical fiber preform. Consequently, the tensile strain to the core will be eliminated, and accordingly the attenuation will decrease. In such case, it is necessary to dope the second group dopants at an average concentration of 0.2 ppm or more, since the effect of reduction in the attenuation is not seen when the concentration of the second group dopants is lower than 0.2 ppm. In the case when the concentration of the second group dopants is higher than 100 ppm, the attenuation increases, presumably due to a defect, in the same manner as in the case of K-element.

Rb, Cs, Mg, Ca, and Sr, which are suitably used as the second group dopants, have a diffusion coefficient of ½ to 1/10 relative to the diffusion coefficient of K at a drawing temperature (2000° C. to 2300° C.), and the extent of their diffusion at a drawing step is less than the core diameter. Therefore, they are advantageous for reducing the viscosity of a core and reducing the Rayleigh scattering loss.

When potassium is solely included as a first group dopant, K elements spread in the whole of the fiber by diffusion, reducing the concentration to 1/10 or less. On the other hand, when an element having a slow diffusion like Cs is included as a second group dopant, Cs elements will not diffuse in the whole core and will not reach the peripheral part of the core, though its concentration in the core is kept in the same as the concentration at the time of doping.

Figure 4:
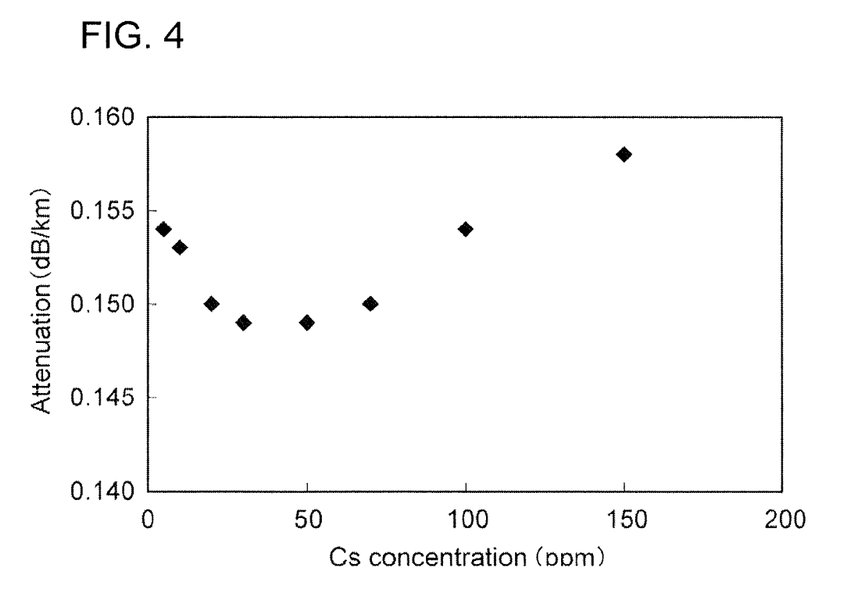
FIG. 4 is a graph showing a relationship between attenuation and average Cs concentration in the core of an optical fiber.

FIG. 4 is a graph showing a relationship between attenuation and average Cs concentration in the core of an optical fiber. Here, K elements were doped as a first group of dopants so that the average concentration of K elements in the core of the optical fiber might be 10 ppm, and Cs elements were doped as a second group of dopants. In the case when the average concentration of Cs elements in the core was lower than 10 ppm, the attenuation did not differ from the case where K elements were solely doped. When the average concentration of Cs elements in the core was made higher than 10 ppm, the attenuation decreased until the case where the average concentration was 50 ppm. However, the attenuation turned to increase when the concentration was more than 50, and at the average concentration of 100 ppm or more, the attenuation increased more than the case where K elements were solely doped.

Figure 5:
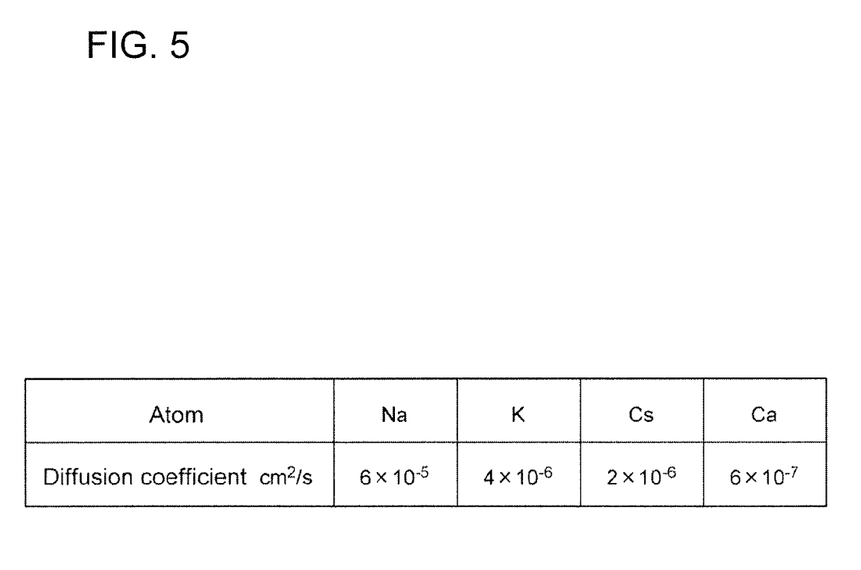
FIG. 5 is show a table showing the respective diffusion coefficients of Na, K, Cs, and Ca.

When the diffusion coefficient of each element in the concentration of 100 ppm at a drawing temperature (2300° C.) was calculated by molecular dynamics calculation, the respective diffusion coefficients of Na, K, Cs, and Ca were as shown in FIG. 5. Assuming from the results, Cs and Ca elements will lie within the core diameter, since the diffusion coefficients of Cs and Ca are ½ or less times the diffusion coefficient of K and the distribution of K concentration spreads to the extent of twice the core diameter upon drawing.

On the other hand, the diffusion coefficients of Cs and Ca are sufficiently large as compared with the diffusion coefficient of about $1\times10^{-12}$ $cm^2/s$ which such impurities as Fe and Ni have and which will affect the attenuation of an optical fiber. Therefore, it is considered as possible to allow sufficient difference in diffusion extent between such impurities and the second group dopants and to let the second group dopants to remain in the glass even if the layer which contains the impurities is removed by etching at the etching step that is performed so as to remove impurities after diffusion-doping.

The diffusion speed of the first group dopants is fast, and therefore, in order to control their diffusion extent within a range of 3 times the MFD, preferably the position (i.e., position where the first group dopants are doped) where the concentration of the first group dopants becomes the maximum in an optical fiber preform is set near the center of the core region. More specifically, if the position where the concentration of the first group dopants becomes the maximum in an optical fiber preform is set at a position corresponding to one third of the MFD in an optical fiber, then the extent of diffusion occurring upon the drawing step can be set to about 3 times the MFD. The second group dopants have slow diffusion speed, and therefore it is possible to control the extent of their diffusion within the core even if they are doped in a ring form at a domain which is distant from the core center.

Figure 6:
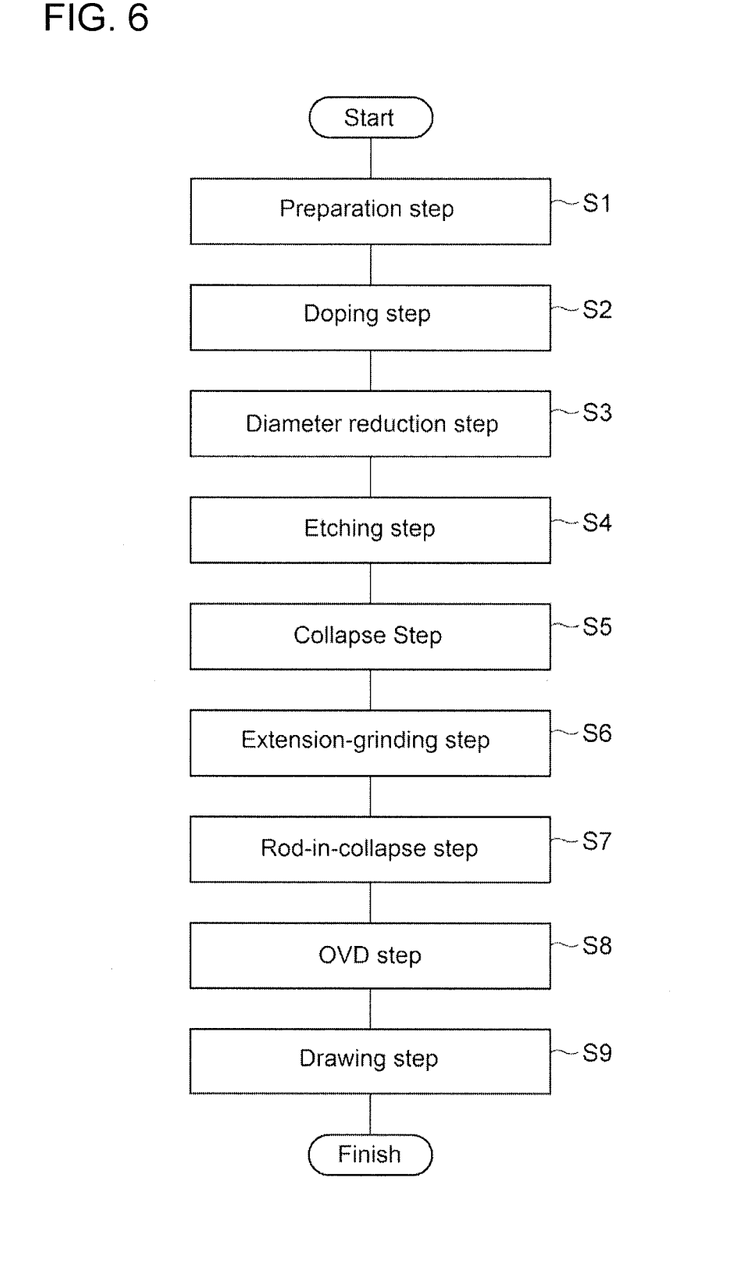
FIG. 6 is a flow chart showing steps for manufacturing the optical fiber of the present invention.

FIG. 6 is a flow chart showing steps for manufacturing the optical fiber of the present invention. The following description also is an example of conditions for an embodiment.

At a preparation step (Step S1), a silica-based glass tube, in which alkali metal elements (dopants) are to be doped, is prepared. The silica-based glass tube contains chlorine (Cl) of 100 atomic ppm and fluorine of 6,000 atomic ppm, whereas the concentration of other dopants and impurities is 10 mol ppm or less. The silica-based glass tube has an outer diameter of 35 mm and an inner diameter of about 20 mm.

At a doping step (Step S2), potassium and cesium are doped as dopants on the inner surface of a silica-based glass tube. Potassium bromide (KBr) and cesium bromide (CsBr) are used as materials. The materials are heated at a temperature of 800° C. by an outside heat source so as to generate vapors of the materials. While such vapors of materials are introduced into a silica-based glass tube together with a career gas of oxygen at a flow rate of 1 SLM (1 liter/min as converted into a standard condition), the silica-based glass tube is heated with an oxyhydrogen burner from the outside so that the outer surface thereof may have a temperature of 2150° C. In such case, the burner is caused to perform, in total, 15 turns of traverse movement for heating at a speed of 40 mm/min, so that the inner surface of a silica-based glass tube is diffusion-doped with potassium metal elements and cesium metal elements.

At a diameter reduction step (Step S3), a silica-based glass tube which is doped with potassium elements is subjected to diameter reduction. In such case, while oxygen is introduced to flow at 0.5 SLM inside the silica-based glass tube, the silica-based glass tube is heated by an outside heat source so that the outer surface of the silica-based glass tube may be 2250° C. The diameter of the silica glass tube is reduced until the inner diameter thereof decreases to 5 mm by heating with the outside heat source through its traverse movement of 6 turns in total.

At an etching step (Step S4), the inner surface of a silica-based glass tube is etched. In such case, vapor phase etching is performed by heating the silica glass tube with an outside heat source while introducing a mixed gas of $SF_6$ (0.2 SLM) and chlorine (0.5 SLM) into the inside space of a silica glass tube. In this way, the inner surface, in which impurities doped with target dopants are contained at high concentration, can be etched, whereby such impurities can be removed.

At a collapse step (Step S5), a silica-based glass tube is processed into a rod. In the collapse step, a silica glass tube 30 is collapsed by heating the outer surface thereof to a temperature of 2150° C. while introducing a mixed gas of oxygen (0.1 SLM) and helium (1 SLM) into the inside thereof and decompressing the absolute pressure in the inside of the silica glass tube to 97 kPa or less. Thus, a core region (the outer diameter: 25 mm) is prepared as a rod. A core layer which does not contain dopants may be formed on the outside of the rod by well-known methods, such as OVD method or collapse method.

At an extension-grinding step (Step S6), a core region is extended to have a diameter of 24 mm, and the peripheral part thereof is removed by grinding so as to make the diameter of 17 mm.

At a rod-in-collapse step (Step S7), a first cladding region is formed on the outside of a core region by a rod-in collapse method. In such method, a core-region rod is inserted into the inside of a silica-based F-doped glass tube, and both of the rod and the tube are heated with an outside heat source so as to be unified. The relative refractive index difference between the core region and the first cladding region is about 0.34% at the maximum. As a result of the rod-in collapse method, the amount of moisture in the core region and the neighboring first cladding region can be controlled to a sufficiently low level.

At an OVD step (Step S8), a rod made by unifying a core region and a first cladding region is extended to have a predetermined diameter, and thereafter a second cladding region containing fluorine is formed on the outside of the rod by the OVD method. Thus, an optical fiber preform is made.

At a drawing step (Step S9), an optical fiber is made by drawing an optical fiber preform which has been prepared according to the above-mentioned manufacturing method. The drawing speed is 2,300 m/min and the drawing tension is 0.5 N. When the concentration of dopants in the fiber after drawing was measured, the concentration of K elements was 10 ppm at the average of the core. The concentration of Cs elements was 20 ppm at the average of the core. The attenuation of the optical fiber thus obtained was 0.150 dB/km at the wavelength of 1550 nm.

By controlling the average concentration of the first group dopants in the core region of an optical fiber preform to 5 ppm or more, the average concentration of K elements in the core of an optical fiber can be made 0.2 ppm or more in the state where the dopants in the optical fiber preform have spread to the cladding region by diffusion at the drawing step. As to the optical fiber in which the core average concentration after fiber-drawing was 10 ppm, the average concentration thereof in the state of preform was 50 ppm. On the other hand, the second group dopants do not diffuse to the outside of a core by drawing, and the average concentration in the preform state remains, as it is, in the fiber state. Therefore, it was necessary to set the concentration of the second group dopants to 0.2 ppm or more and 100 ppm or less in the preform state, that is, the same concentration as in the fiber state.

What is claimed is:

1. An optical fiber comprising:
    a core made of silica glass containing a first group of dopants by concentration of 0.2 ppm or more on the average, the first group of dopants consisting of Na element, K element, or any compound thereof, and a second group of dopants by 0.2 ppm or more on the average, the second group of dopants decreasing the viscosity of silica glass and having a diffusion coefficient of $1 \times 10^{-12}$ cm$^2$/s or more and smaller than the diffusion coefficient of the first group dopants at a temperature of 2000° C. to 2300° C.; and
    a cladding formed around the core and made of silica glass containing fluorine, the cladding having a refractive index lower than the refractive index of the core.

2. An optical fiber according to claim 1, wherein the average concentration of the first group of dopants is 10 ppm or less.

3. An optical fiber according to claim 1, wherein the average concentration of the first group dopants is 0.2 ppm or more and 10 ppm or less at a domain up to 3 times the mode field diameter, and the average concentration of the second group dopants in the core is higher than the average concentration of the first group dopants.

4. An optical fiber according to claim 2, wherein the average concentration of the first group dopants is 0.2 ppm or more and 10 ppm or less at a domain up to 3 times the mode field diameter, and the average concentration of the second group dopants in the core is higher than the average concentration of the first group dopants.

5. An optical fiber according to claim 1, wherein the average concentration of the second group dopants in the core is 0.2 ppm or more and 100 ppm or less.

6. An optical fiber according to claim 2, wherein the average concentration of the second group dopants in the core is 0.2 ppm or more and 100 ppm or less.

7. An optical fiber according to claim 3, wherein the average concentration of the second group dopants in the core is 0.2 ppm or more and 100 ppm or less.

8. An optical fiber according to claim 4, wherein the average concentration of the second group dopants in the core is 0.2 ppm or more and 100 ppm or less.

9. An optical fiber according to claim 1, wherein
the core contains, as the second group dopants, any one or more selected from the group of Rb, Cs, Mg, Ca, and Sr, at an average concentration of 0.2 ppm or more and 100 ppm or less.

10. An optical fiber according to claim 2, wherein
the core contains, as the second group dopants, any one or more selected from the group of Rb, Cs, Mg, Ca, and Sr, at an average concentration of 0.2 ppm or more and 100 ppm or less.

11. An optical fiber according to claim 3, wherein
the core contains, as the second group dopants, any one or more selected from the group of Rb, Cs, Mg, Ca, and Sr, at an average concentration of 0.2 ppm or more and 100 ppm or less.

12. An optical fiber according to claim 4, wherein
the core contains, as the second group dopants, any one or more selected from the group of Rb, Cs, Mg, Ca, and Sr, at an average concentration of 0.2 ppm or more and 100 ppm or less.

13. An optical fiber according to claim 5, wherein
the core contains, as the second group dopants, any one or more selected from the group of Rb, Cs, Mg, Ca, and Sr, at an average concentration of 0.2 ppm or more and 100 ppm or less.

14. An optical fiber according to claim 6, wherein
the core contains, as the second group dopants, any one or more selected from the group of Rb, Cs, Mg, Ca, and Sr, at an average concentration of 0.2 ppm or more and 100 ppm or less.

15. An optical fiber according to claim 7, wherein
the core contains, as the second group dopants, any one or more selected from the group of Rb, Cs, Mg, Ca, and Sr, at an average concentration of 0.2 ppm or more and 100 ppm or less.

16. An optical fiber according to claim 8, wherein
the core contains, as the second group dopants, any one or more selected from the group of Rb, Cs, Mg, Ca, and Sr, at an average concentration of 0.2 ppm or more and 100 ppm or less.

17. An optical fiber preform comprising:
a core region to become the core of an optical fiber and made of silica glass, the core region containing a first group of dopants selected from the group of Na element, K element, or a compound thereof, at an average concentration of 20 ppm or more and 100 ppm or less and a second group of dopants used for decreasing the viscosity of silica glass and having diffusion coefficient of $1 \times 10^{-12}$ cm$^2$/s or more at a temperature of 2000° C. to 2300° C. and smaller than the diffusion coefficient of the first group dopants, at an average concentration of 0.2 ppm or more and 100 ppm or less; and
a cladding region made of silica glass containing contains fluorine and exhibiting a refractive index lower than the refractive index of the core region and formed around the core region so as to become the cladding of the optical fiber.

18. An optical fiber preform according to claim 17, wherein
the concentration of the first group dopants is the maximum at a position in a cylindrical domain within ⅓ or less of the mode field diameter in the optical fiber.

* * * * *